(12) United States Patent
Bloxham et al.

(10) Patent No.: US 6,904,473 B1
(45) Date of Patent: Jun. 7, 2005

(54) DIRECT MEMORY ACCESS CONTROLLER AND METHOD OF FILTERING DATA DURING DATA TRANSFER FROM A SOURCE MEMORY TO A DESTINATION MEMORY

(75) Inventors: Christopher Bloxham, Chichester (GB); Kathryn E. Rickard, Romsey (GB)

(73) Assignee: Xyratex Technology Limited, Havant (GB)

( * ) Notice: Subject to any disclaimer, the term of this patent is extended or adjusted under 35 U.S.C. 154(b) by 224 days.

(21) Appl. No.: 10/209,572

(22) Filed: Jul. 31, 2002

Related U.S. Application Data (60) Provisional application No. 60/382,956, filed on May 24, 2002.

(51) Int. Cl.[7] ............................................. G06F 13/28
(52) U.S. Cl. ............................. 710/22; 707/3; 707/6; 714/37; 714/39; 714/45; 714/46
(58) Field of Search ................................ 710/22; 707/3, 707/6; 714/39, 37, 45, 46

(56) References Cited

U.S. PATENT DOCUMENTS

| | | | |
|---|---|---|---|
| 6,266,789 B1 | 7/2001 | Bucher | 714/39 |
| 6,628,891 B1 * | 9/2003 | Vantalon et al. | 386/94 |
| 6,651,250 B1 * | 11/2003 | Takai | 725/31 |
| 2001/0018719 A1 * | 8/2001 | Francis | 710/22 |
| 2001/0037350 A1 * | 11/2001 | Aue et al. | 708/303 |

FOREIGN PATENT DOCUMENTS

JP 406175968 A * 6/1994 ........... G06F/13/28

* cited by examiner

*Primary Examiner*—Jeffrey Gaffin
*Assistant Examiner*—Justin Knapp
(74) *Attorney, Agent, or Firm*—Cohen, Pontani, Lieberman & Pavane (57) ABSTRACT

A direct memory access controller includes a source memory controller for controlling a source memory, a destination bus controller for controlling the transfer of data to a destination memory, a first-in-first-out memory buffer for receiving data from the source memory, and a filter connected upstream of the first-in-first-out memory buffer for comparing the source memory data to a filter criterion and passing to the first-in-first-out memory buffer only that data which matches the filter criterion.

43 Claims, 7 Drawing Sheets

Source Memory Address sequence

Fig. 4

SDRAM Internal banks

Captured data

Fig. 5

A(L) = last word written to page A

CMD= Command bus, CS# = Chip select

Fig. 6

A(L) = last word read from page A

CMD= Command bus, CS# = Chip select,

DIRECT MEMORY ACCESS CONTROLLER AND METHOD OF FILTERING DATA DURING DATA TRANSFER FROM A SOURCE MEMORY TO A DESTINATION MEMORY

RELATED APPLICATION

The present application claims the benefit of the filing date of co-pending provisional application No. 60/382,956, filed on May 24, 2002, the entire contents of which are incorporated herein by reference.

BACKGROUND OF THE INVENTION

1. Field of the Invention

The present invention relates to a direct memory access controller with a filter for filtering data during transport of the data from a source memory to a destination memory.

2. Description of the Related Art

Figure 1:
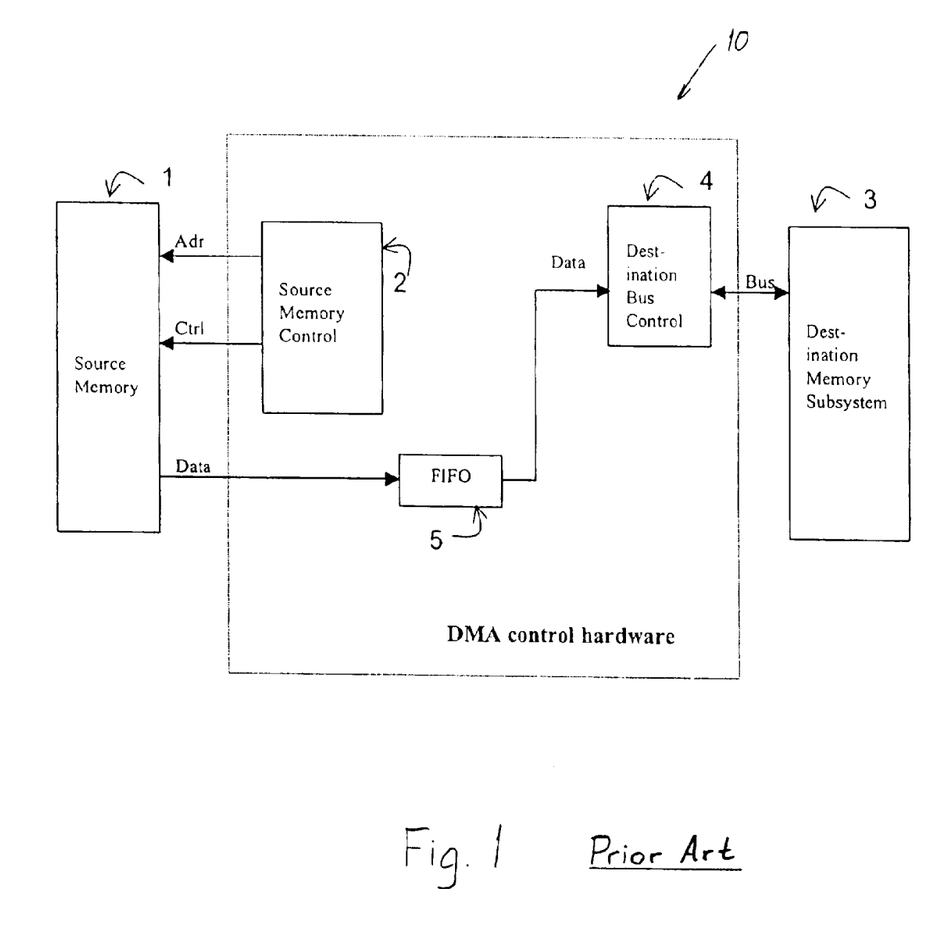
FIG. 1 is a block diagram of a prior art direct memory access controller according to the prior art.

Direct Memory Access (DMA) controllers are specialized processors used for transferring data between a source memory and a destination memory, thereby allowing a Central Processing Unit (CPU) to simultaneously perform other tasks. Referring to FIG. 1, a standard DMA controller 10 interfaces directly with a source memory 1 and is connected via a bus 8 to a destination memory subsystem 3. The DMA controller 10 includes a source memory control 2, a destination bus control 4 and a first-in-first-out memory device (FIFO) 5. The external CPU initiates data transfer in the DMA controller by setting up DMA registers with a memory address at which the data of interest is located in the source memory 1, a memory address of the destination memory at which to start the transfer to the destination memory 3, and the number of bytes to be transferred.

The source memory control 2 starts to read data from the source memory 1 and stores the read data in the FIFO 5. At the same time, the destination bus control 4 arbitrates for the bus 8 and then starts to transfer data from the FIFO 5 across the bus 8 to the destination memory subsystem 3. The DMA controller 10 is external to the CPU and the destination bus control 4 acts as a master on the bus 8 which is connected to the destination memory 3. When the specified amount of data has been transferred, an interrupt is raised or status word updated to indicate completion.

The above-described DMA controller 10 may be used, for example, in a network analyzer. In such an implementation, the source memory 1 is a capture buffer of the network analyzer and the destination memory subsystem is a part of a host PC which includes the CPU that operatively initiates the data transfer to the destination memory, i.e., the CPU memory of the host PC. The network analyzer is a test system that analyzes links and must capture data from the link being analyzed into a capture buffer. After capture, some or all of the data may need to be transferred to the system memory of the host PC (i.e., the destination memory). It may be desirable for only certain parts of the data are to be transferred to the destination memory. The location of the required data in the capture buffer memory may not be known. But, for efficiency of operation it is preferred that only those frames or packets of data that are needed be uploaded from the capture buffer memory to the destination memory.

One problem with the above-described prior art implementation is that all of the captured data is typically transferred from the source memory to the destination memory without regard to the data content. If the location in the buffer memory of the required data is not known, all of the data must first be transferred to the destination memory and the transferred data must then be searched in the destination memory until the required data is identified. Accordingly, a large portion of the data transferred may be discarded.

U.S. Pat. No. 6,266,789 to Bucher et al. (Bucher) discloses a buffer memory system for a protocol analyzer that includes a capture buffer memory for receiving data from a link via an interface. A host port connects the capture buffer to a host processor having a memory and a processor. The protocol analyzer disclosed in Bucher also includes a search engine that searches the buffer memory for data matching a desired memory pattern. When the memory pattern is found, reading of the memory is halted and a match signal is generated. The user can then determine the location of the match in the buffer memory and access the matching data.

The Bucher reference requires a three step process controlled by software on the host computer to transfer the required data: (1) initiate the search, (2) interrogate the analyzer to retrieve the current data read address, and (3) setup and initiate the DMA controller to transfer the required data based on that address. Furthermore, Bucher searches for a single match and, therefore, the three part process must be repeatedly rerun, making it unnecessarily time consuming and cumbersome when multiple pieces or segments of data must be transferred.

Bucher also teaches that a filter, in the form of logic circuitry, may be applied to selectively write data from the interface to the data buffer memory. One problem with the filtering in Bucher is that it operates upstream of the data buffer to thereby limit the data being captured and stored. It is not, therefore, possible to vary the filter conditions to analyze or view data that has already been eliminated through filtering.

SUMMARY OF THE INVENTION

It is the desideration of the present invention to provide an enhanced direct memory access controller that includes an integrated data filter for facilitating the efficient transfer of only required or desired data from one buffer to another in a single pipelined operation.

In accordance with the present invention, a direct memory access (DMA) controller for facilitating data transfer from a source memory to a destination memory via a destination bus includes a source memory controller for transmitting instructions to the source memory. A destination bus control of the DMA controller is connected to the destination bus of the destination memory. The DMA controller also includes a first-in-first-out (FIFO) memory buffer for receiving sub-blocks of data from the source memory in response to the source memory controller instructions and for transmitting at least a portion of the received sub-blocks of data to the destination memory via the destination bus. A filter operatively utilizing filter criteria is connected between the first-in-first-out memory buffer and the source memory for determining, for each sub-block, whether the sub-block is a matched sub-block that includes data matching the filter criteria and for outputting the result of the comparison. The DMA controller then uses the results of the comparison to pass only matched sub-blocks of data to the destination memory.

In further accordance with the present invention, a process for transferring data from a source memory to a destination memory using a direct memory access controller that includes a source memory controller, a filter, a first-in-first-out memory buffer and a destination bus controller is initiated by the receipt of instructions at the direct memory access controller to transfer data from the source memory to the destination memory. The data from the source memory is then directed to the filter using the source memory controller, wherein the data is divided into sub-blocks. The filter determines for each of the sub-blocks whether it matches the specified filtering criteria. All sub-blocks that match the filter criteria are passed to the first-in-first-out memory buffer, and only those matched sub-blocks of data are then transferred to the destination memory by the destination bus control.

The data is sent to the filter until a match is found. Instead of selecting data to be transferred from the sub-block in which matching data is found, the data to be transferred may comprise data located before, after, or within the sub-block of data in which the matching data is found. Accordingly, the matched data may be considered a trigger point, wherein data to be transferred is defined by a location of the data relative to the trigger point. The effective transfer start address may be up to N words prior to the trigger point, where N is the depth of the data pipeline, or any amount after the trigger point. According to this alternative embodiment, the data to be transferred may be located in a sub-block of data that is before, after, or within the sub-block including the trigger point. The data to be transferred may be in multiple sub-blocks. Furthermore, the sub-blocks of data sent from the source memory are not required to be aligned packets in this embodiment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 2:
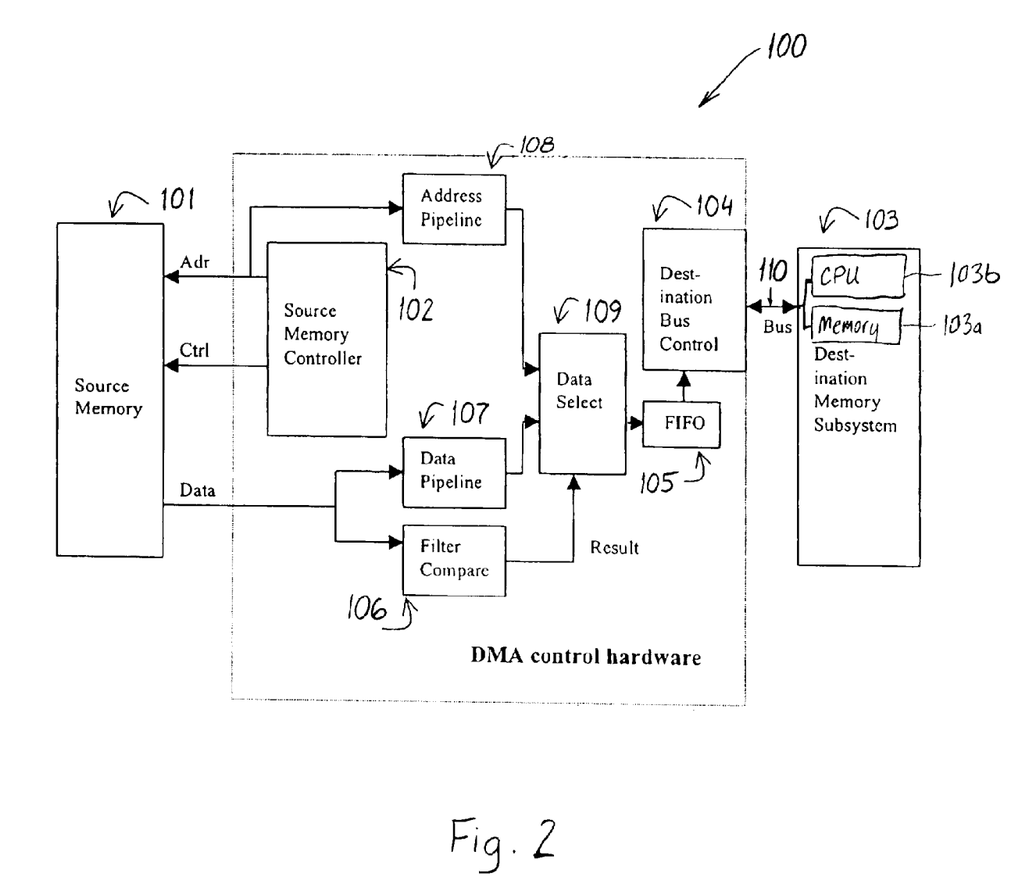
FIG. 2 is a block diagram of a direct memory access controller according to an embodiment of the present invention.

A direct memory access (DMA) controller 100 constructed in accordance with an embodiment of the present invention is shown in FIG. 2 connected to a source memory 101 and a destination memory subsystem 103. The DMA controller 100 may by way of example be used as a part of a network analyzer in which the source memory 101 defines a capture buffer and the destination memory subsystem is implemented by a computer including a Central Processing Unit (CPU) 103b and memory 103a.

A source memory controller 102 of DMA controller 100 is connected to the source memory 101 for controlling the source memory. In a DMA operation, efficient access to the source memory 101 requires a burst read mode. Accordingly, the source memory may be a static random access memory (SRAM) buffer readable in consecutive clock cycles with consecutive or random addresses. However, a synchronous dynamic random access memory (SDRAM) may also be used as a more cost effective solution; SDRAMs permit the closing of one row for precharge and the opening of another row in one bank while reading continually from another bank (interleaving) in a burst access mode. The data stored in the source memory 101 is divided into sub-blocks (e.g., frames or packets) of data which may be fixed (e.g., an asynchronous transfer mode (ATM) cell) or may vary in size (e.g., a Gigabit Ethernet protocol frame).

At initiation of the DMA operation or process, the source memory controller 102 is provided with an initial source address and a length of the block to be read, and reads the data from source memory 101. In a simple embodiment, the source memory controller 102 reads from the source memory sequentially, as for example in successive word-size increments. Where the sub-block size of the data in source memory 101 is fixed, the source read address may be incremented so that some of the data in each sub-block is not read and skipped over. This non-sequential read procedure may be applicable, for example, in an ATM analyzer in which required cells are identified by comparing a single word of the cell to match one or more criteria and a table of pointers to the required cells in the source memory is desired. In this example, the source read address can be incremented or decremented by the sub-block size so that the memory controller reads only that word required for the comparison. Thus, if the word size is 8 bytes and the sub-block size is 64 bytes, the source memory could be read in ⅛th the time required for a purely sequential read.

Figure 3A:
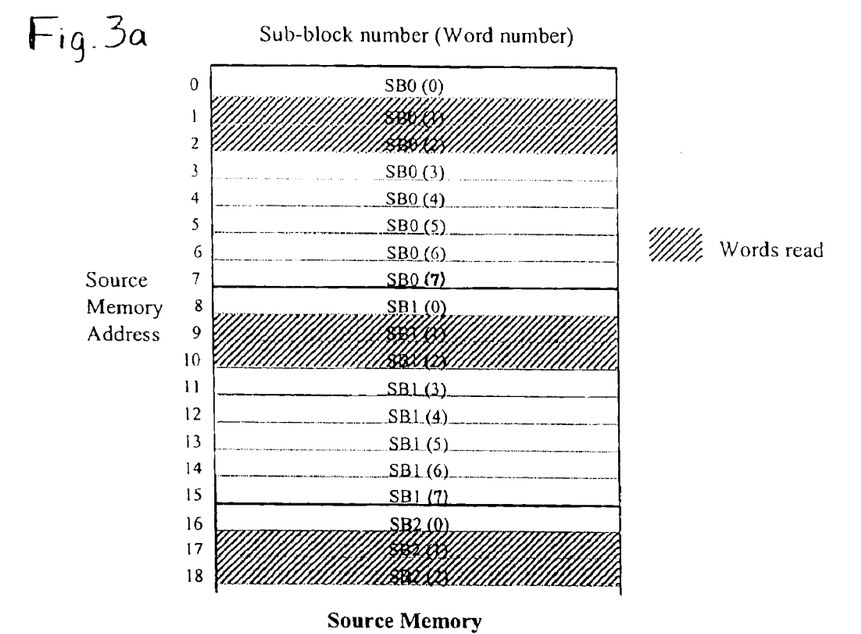
FIG. 3a depicts a source memory used with the direct memory access controller of FIG. 2.
Figure 3B:
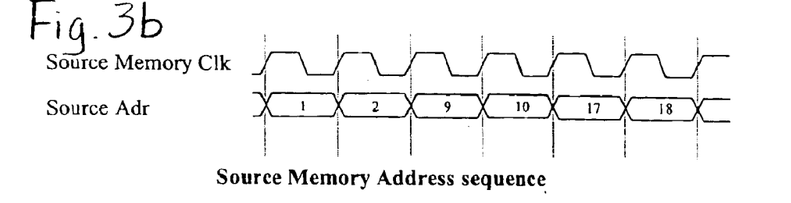
FIG. 3b is a timing diagram showing the sequence in which the source memory addresses of the memory of FIG. 3a are read.

In another implementation or embodiment, multiple sequential words may be read followed by a jump to the next sub-block of data. For example, FIG. 3a depicts a source memory having sub-blocks SB0, SB1 and SB2. Each sub-block includes eight words 0–7. However, only the second and third words of each block are read. The words read correspond to the DMA parameters for filter and data select, as described in further detail below. The timing diagram of FIG. 3b illustrates the reading of each word in the foregoing example; the sub-blocks in FIG. 3a can accordingly be read in one quarter the time that a purely sequential read would require.

Figure 4:
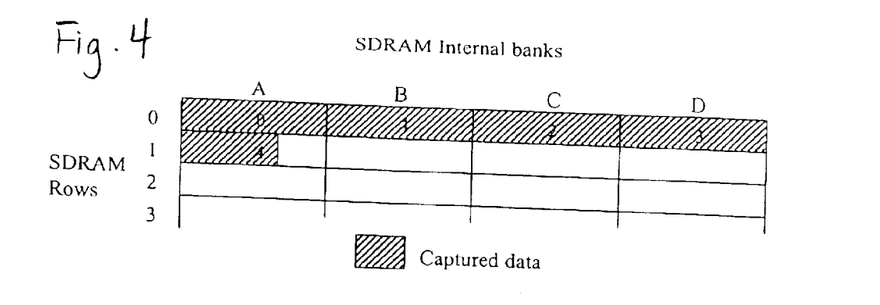
FIG. 4 depicts a source memory configuration that may be used with the direct memory access controller of FIG. 2.

FIG. 4 depicts banks A–D of an SDRAM showing rows 0–3 and the manner in which data may be saved, each row of a bank defining a page of data. An efficient memory format for a network analyzer capture buffer may allow data to be captured sequentially, filling the first row of bank A (page 0), the first row of bank B (page 1), the first row of bank C (page 2), the first row of bank D (page 3), and then wrapping around to the second row of bank A (page 4). This buffer format is used, for example, in a Gigabit Ethernet Analyzer designed by Xyratex of Havant, UK. In this illustration, the burst mode of the SDRAM may be employed to free up the command bus after an initial write command to the current page. While the data is being stored on the current page, the next page to be written to may be precharged and activated, thereby allowing sequential access without loss of bandwidth. The timing diagram of FIG. 5, which illustrates a portion of this operation, shows the burst write of the last five words of page 0 in the first row of Bank A followed by the burst write of the start of page 1 in the first row of bank B. The precharge and activation of the first row of bank C, which will be written to after the completion of page 1, is performed during the burst write to the first row of bank B. In this implementation, the next page to be written to is precharged and activated immediately after the first write operation of the current page. It is assumed in FIG. 5 that the first row of bank B (page 1) has been previously activated (i.e., prior to the starting point of the timing diagram).

Figure 5:
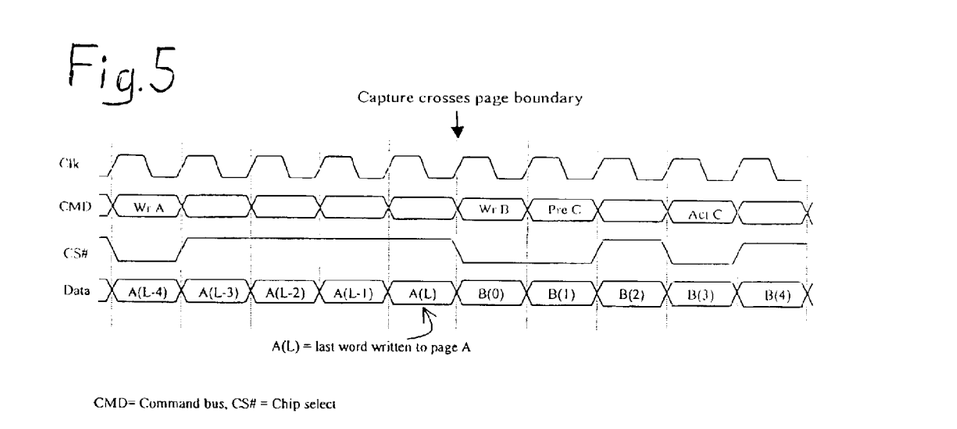
FIG. 5 is a timing diagram for the writing of data to a source memory.

Although the implementation described with reference to FIG. 5 precharges and activates the next page at the beginning of the write operation of the current page, the precharging and activation of the next page to be written may be performed at any time during the write of the previous page. Furthermore, the implementation of FIG. 5 uses page mode bursts which allows a flexible burst length up to that of the full page, but other burst modes may be used while still permitting the interleaving of the precharge and activation of the next page to be written.

Figure 6:
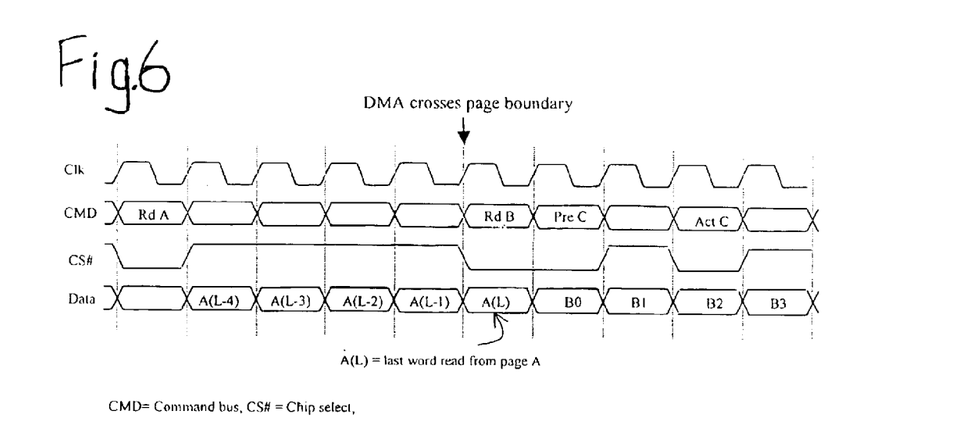
FIG. 6 is a timing diagram for the reading of data from a source memory.

The buffer memory organization of FIG. 4 also advantageously allows efficient reading of the source memory by the enhanced DMA controller 100 of the present invention. The DMA controller 100 may read the data in consecutive clock cycles in the open rows. For example, the page interleaving described above with reference to FIG. 5 may also be used during a read operation to eliminate bandwidth loss when crossing page boundaries. FIG. 6 illustratively depicts a read command for reading row 1 of bank B, followed by precharging and activation of row 1 of bank C. In the portion of the operation shown in FIG. 6, the last five words of page 0 in the first row of bank A are read, followed by a first burst read of the start of page 1 in the first row of bank B. (It is assumed in FIG. 6 that page 1 in the first row of bank B has been previously activated prior to the start of the timing diagram). A precharge and activation of page 2 in the first row of bank C is interleaved with the read of page 1. As shown in FIG. 6, data is read from the SDRAM source memory on every clock cycle (with the exception of refresh periods). In this particular example, the precharge and activation of the next page is performed immediately after the first read command of the current page, although the precharge and activation of the next page may be performed at any time during the read of the current page. Moreover, the illustrated implementation utilizes page mode burst to allow flexible burst lengths of up to one page, although any burst mode that allows interleaved operation may be used. FIG. 6 also shows a read delay of 1 clock cycle from issuance of the read command to the availability of data on the data bus; in other implementations, the delay may be multiple clock cycles.

When non-sequential reading such as illustrated in FIGS. 3*a* and 3*b* is used, the source memory command bus is used on a more continuous basis (i.e., single access or short burst reads rather than full page bursts) and it may not be possible to effectively hide the row precharge and activation. The buffer format of FIG. 4 nevertheless still ensures very high access bandwidth. Accordingly, when a data transfer via DMA controller 100 commences, source memory controller 102 can read the source memory 101 rapidly and continuously.

A filter 106 in DMA controller 100 receives data from the source memory 101 in response to instructions provided to the source memory by source memory controller 102. Filter 106 includes logic circuitry. For each sub-block of data received by filter 106, the logic circuitry of the filter determines whether the sub-block of data matches a filter criterion. Prior art techniques for the filtering of required blocks may be employed, depending on the specific type of filtering to be carried out for an application. The matched sub-blocks are then delivered to a first-in-first-out memory buffer (FIFO) 105.

To retain the result of the filtering of a sub-block from the point of determination to the end of the sub-block, the start and end of each sub-block must be identified. The start of the sub-block is easily determined if the sub-blocks are a fixed length. When the sub-blocks are of variable length, however, the sub-block delimiter must be decoded as it is read. Thus, with a variable length sub-block, the source memory controller 102 must be used in sequential access mode so that the beginning and end of each sub-block can be determined.

Figure 7:
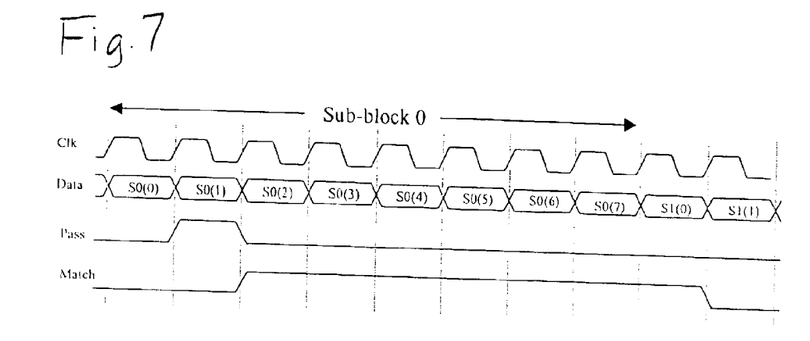
FIG. 7 is a timing diagram for the operation of a filter block of the direct memory access controller of FIG. 2.

As each word is received at filter 106 from source memory 101, it is compared with at least one filter criterion. The criterion may, for example, comprise a single pattern word with a mask and an "equal to", "greater than", or "less than" comparison operator, the latter two being useful for timestamp comparisons. The criterion may further include an exclusive function such that the word passes the criterion if does not contain the pattern word. The criterion may further include a plurality of consecutive words to which the exclusive function or other comparison operator is applied. Multiple patterns may be employed and the results of each may be logically ORed or ANDed together. To maintain maximum system bandwidth, a pass/fail result for each word read from source memory 101 is generated in a single clock cycle (see FIG. 7). The pass result is latched until reading of the sub-block has ended. If all pass conditions are met, the sub-block is deemed to be a matched sub-block. The filter comparison may be performed without regard to the alignment or offset of the word within the sub-block (i.e., location of the word being read within the sub-block). Alternatively, a required offset within the sub-block may be included in the pass/fail comparison. Furthermore, sequential word compares may also be performed where the filter criteria require a sequence of pass results to achieve a match for the word being filtered. The source memory controller 102 must be used in the appropriate access mode so that the data is appropriately provided to filter 106. For non-aligned compares, a sequential access mode is required; for offset-specific compares, an accelerated access mode such as that depicted in FIG. 3*a* may be used.

A data pipeline 107 is connected to source memory 101 in parallel with the filter 106. Data read from the source memory is stored in the data pipeline for a time period corresponding to the time required to perform the data filtering operation so that the result of the filtering operation for each sub-block is available when the sub-block of data is read from the output of data pipeline 107. The data pipeline may comprise a shift register or a FIFO block. The minimum pipeline depth is defined by the maximum offset of the filter comparison within the sub-block, and may therefore be the depth of the sub-block if no maximum filter offset is defined.

An address pipeline 108 is connected to the Address line between the source memory controller 102 and source memory 101 to delay the source memory address of the sub-block being compared so that it is available when the beginning of the sub-block is read from the output of data pipeline 107. Address pipeline 108 may be used instead of the data pipeline if the DMA controller is required to transfer lists of pointers to matched sub-blocks as an alternative to transferring of the sub-blocks themselves. Address pipeline 108 may comprise a shift register or a FIFO block to provide the desired delay. On the other hand, the address pipeline may be more efficiently implemented as an arithmetic operator for performing a calculation using the current source memory address of source memory controller 101 and subtracting an amount determined by the pipeline delay and the increment method of the source memory controller 102.

The outputs of filter 106, data pipeline 107, and address pipeline 108 are transmitted to a data selector 109 which determines, based on the result of the filtering operation by filter 106, whether the data sub-block should be transmitted in part or whole to the destination memory subsystem 103. Optionally, the data pipeline 107 may be omitted so that only the source memory address is passed to data selector 109 with results of the filter 106, with a list of pointers to the required sub-blocks being assembled in the destination memory. Similarly, the address pipeline 108 may be omitted if the address of the sub-block is not required.

Figure 8:
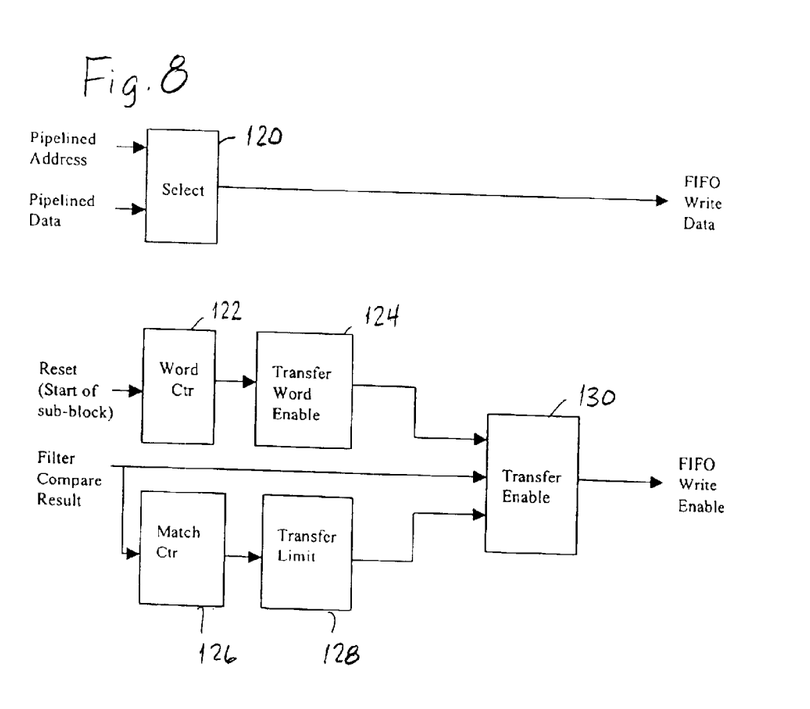
FIG. 8 is a block diagram of a data selector of a direct memory access controller according to an embodiment of the present invention.

With reference to FIG. 8, the data selector 109 comprises a select block 120 that includes information from the initial data transfer instructions indicating which portions of the required sub-blocks should be stored in the destination memory. Data selector 109 can only transfer data that it receives; accordingly, the source memory controller must be used in the appropriate access mode—normally the sequential access mode as discussed above. Thus, in the non-sequential read shown in FIG. 3*a*, the words which are read must include all of the words required to be saved in the destination memory and all words required by filter 106.

Instead of selecting data to be transferred from the sub-block in which matching data is found, the data to be transferred may comprise data located before, after, or within the sub-block of data in which the matching data is found. Accordingly, the matched data may be considered a trigger point, wherein data to be transferred is defined by a location of the data relative to the trigger point. The effective transfer start address may be up to N words before the trigger point, wherein N is the depth of the data pipeline, or any amount after the trigger point. According to this alternative embodiment, the data to be transferred may be located in multiple sub-blocks. Furthermore, the sub-blocks of data sent from the source memory are not required to be aligned packets in this embodiment.

A word counter 122 tracks the word position within a sub-block, and is reset at the start of each sub-block. Start and end word transfer parameters specified prior to the start of the DMA operation are compared within the word counter to select the subset of words in the required sub-block that is to be transferred by select block 120. Where the source address of the sub-block is selected, a single address word per sub-block is chosen for transfer.

Data selector 109 may also be utilized to limit the amount of data transferred to destination memory 103, and thereby prevent an overflow of the destination memory when the number of sub-blocks matching the one or more criteria is not known prior to the DMA operation. To effect this feature, a transfer limit parameter defines the maximum number N of matches that the DMA process can transfer to the destination memory 103. If the transfer limit is reached, the pipelined sub-block source address of the subsequent match is latched, thereby allowing the next DMA operation to begin at the latched source memory address. Data selector 109 may also signal to the source memory controller 102 to end the DMA operation early.

A transfer word enable 124 is combined with the filter comparison result at a transfer enable 130 to generate a write enable signal for FIFO 105, into which data to be transferred to destination memory 103 is delivered. Transfer word enable 124 allows only data from matched sub-blocks to be delivered to FIFO 105.

A match counter 126 may also be added to the data selector 109. In a preferred embodiment, the match counter 126 may be interrogated by the host system to allow statistics to be gathered about the data in the buffer without having to first transfer the data. A transfer limit 128 may be set to zero to prevent the transfer of data when DMA controller 100 is used to gather statistics. In this mode, the source memory controller 102 can be run at the full supported bandwidth for high speed generation of buffer statistics. This is particularly advantageous when the capture buffer (i.e., source memory 101) is utilized in wrap mode. The present invention allows statistics to be generated on the portion of data received from the link that is contained in the buffer at any given time.

Figure 9:
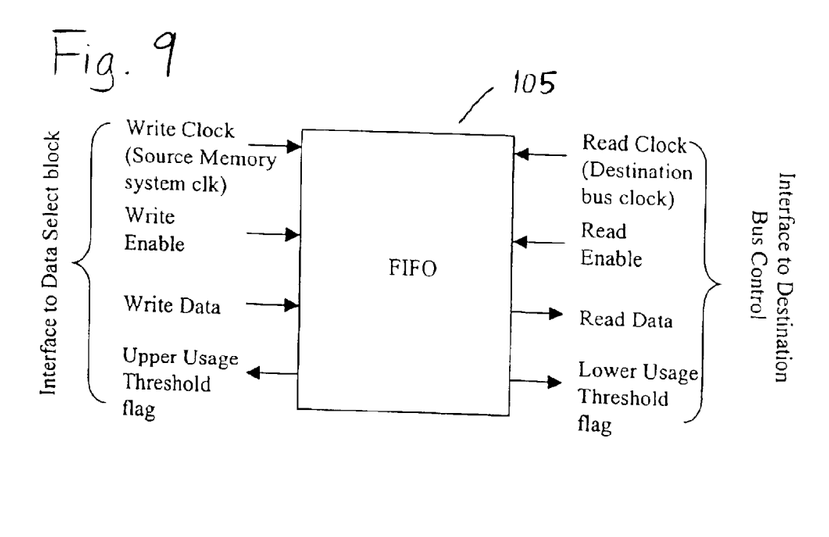
FIG. 9 is a block diagram of a first-in-first-out memory buffer according to an embodiment of the present invention.

As noted above, data output by data selector 109 is stored in first-in-first-out memory buffer (FIFO) 105 before being passed to the destination memory 103. The FIFO 105 interface is illustrated in FIG. 9. The FIFO implementation allows efficient use of bus 110 to access and communicate with destination memory. The filtered data flow need not be continuous; FIFO 105 permits a large number of filtered sub-blocks or sub-block addresses to be buffered prior to commencing a burst mode bus transfer. FIFO 105 accordingly provides a flag, indicating that a lower use threshold has been exceeded, which is transmitted to a destination bus control 104. The lower use threshold exceeded flag indicates that FIFO 105 has received enough data to effect an efficient transfer of data. FIFO 105 can have separate read and write clocks and thus allows the logic blocks prior to destination bus control 104 to operate in a different clock domain than the destination bus. If FIFO 105 further fills to an upper usage threshold, then a flag is set to indicate to the source memory controller 102 that a pause in the read operation is required until the usage level is reduced by a transfer of data to destination memory 103. Implementation of the FIFO 105 of the present invention may comprise a standard FIFO implementation.

The destination bus controller 104 is the interface connecting DMA controller 100 to bus 110 of destination memory subsystem 103. Where the DMA controller is implemented in a Network Analyzer, bus 110 may comprise a PCI bus of a PC host. The destination memory subsystem 103 may be local or remote. The interface to the destination memory subsystem may be parallel or serial interface. Furthermore, the destination memory subsystem 103 may comprise a multi-drop or networked destination bus including multiple discrete memory destinations. When FIFO 105 indicates that a usage level has exceeded the lower usage threshold, which is defined for efficient bus utilization, destination bus controller 104 arbitrates for control of bus 110 and, as bus master, bursts data from FIFO 105 to the destination memory subsystem 103.

Figure 10:
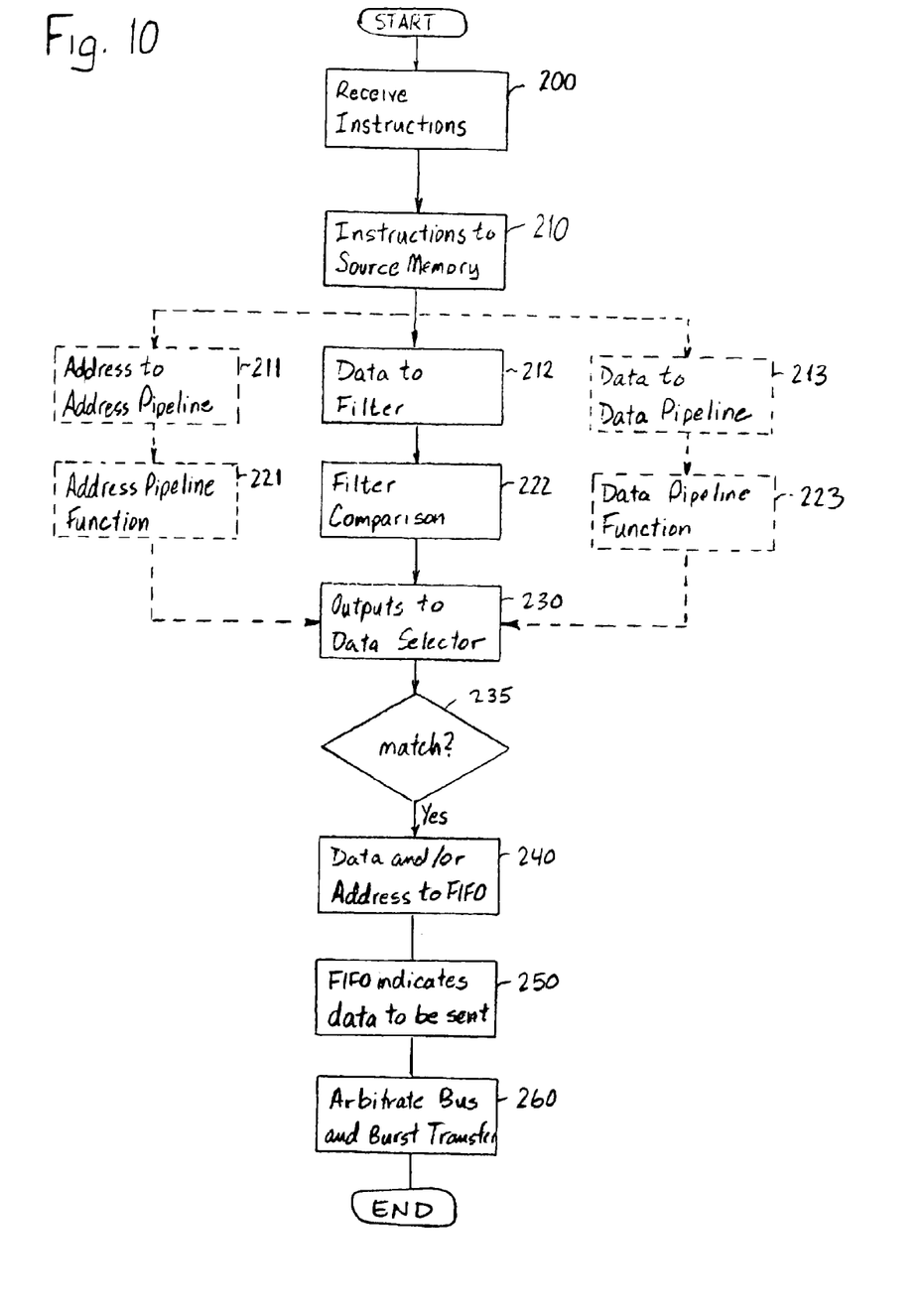
FIG. 10 is a flow chart of a process of transferring data from a source memory to a destination memory according to an embodiment of the present invention.

The process of transferring data from source memory 101 to a destination memory 103a, in accordance with the present invention, is shown in FIG. 10 and starts with receipt of instructions for transferring data from a source memory to a destination memory (step 200). The process depicted in FIG. 10 is a pipelined process in which each of the steps performed in parallel with the others on successive cells. That is each step of FIG. 10 continuously performs its function on the next successive cell such that new cells of data are continuously transferred through the process as the previous data is being processed. Accordingly, FIG. 10 merely shows the procedural steps performed on each cell and is not meant to suggest that the entire procedure must be completed for one cell before accepting the next cell.

Where the DMA controller is part of a network analyzer that is connected to a host PC having a CPU 103b and CPU memory 103a, the FIG. 10 process may be initiated by a host processor such as CPU 103b. The instructions may comprise a chain of DMA requests from the host processor. Furthermore, the DMA controller need not be dedicated to one host processor and accordingly, may receive DMA transfer requests from a plurality of host processors. In any event, for each DMA transfer request these instructions provide parameters to DMA controller 100 for control of the source memory controller 102, filter 106, data select 109, and destination bus controller 104 and include the initial source address (i.e., the location of the start of the data block to be read in the source memory), the length of the source memory block of data to be used, the location of the word or words in each sub-block of data to be compared by the filter, the filter criterion to which the word or words of the sub-block are to be compared for determining whether the sub-blocks should be transferred, which words, if any, of a determined sub-block are to be transferred to the destination memory, and the capacity of the destination bus buffer.

The source memory control 102 then instructs source memory 101 to transmit data to filter 106 and data pipeline 107, beginning with the initial source address (step 210). As noted above, the data is in the form of sub-blocks (i.e., frames or packets). If the address of each data sub-block is required, that address may be received or calculated at the address pipeline 108 while filter 106 and data pipelline 107 concurrently receive the actual data (steps 211, 212, 213). If only the address of the sub-blocks must be saved, as for example where the destination memory will contain a list of pointers, then the data sub-blocks need not be transmitted to and stored in the data pipeline 107.

Upon receipt of the respective data, each of filter 106, data pipeline 107, and address pipeline 108 perform their respective tasks on that data (steps 221, 222, 223). For data pipeline 107 and address pipeline 108, steps 222 and 223 include storing of the data for that time delay needed to assure that the sub-block data and address are received at data selector 109 at the same time that the filtering result for that sub-block is received at the data selector.

Data selector 109 thus receives each sub-block of data from data pipeline 107 (if applicable), the address of each sub-block from address pipeline 108 (if applicable), and the filtering result for each sub-block from filter 106 (step 230).

If the sub-block filtering result from filter 106 indicates a match with the filter criterion (step 235), then data selector 109 transmits the selected data from that sub-block to FIFO 105 (step 240). The selected data may comprise all or a portion of the sub-block data and/or the sub-block start address in the source memory. Furthermore, the selected data may also include data from a previous sub-block or a later sub-block as described above.

After receiving the data, FIFO 105 instructs destination bus controller 104 that the data is to be sent (step 250), and destination bus control 104 arbitrates for bus 110 and, as bus master, transfers the data to destination memory 103 (step 260). At step 250, FIFO 105 stores the data until it exceeds a lower usage threshold and only then instructs that the data is to be sent. This lower usage threshold is based on the capacity of the bus 110 and is defined for efficient transfer of data. At step 260, FIFO 105 commences a burst mode bus transfer of the data to the destination memory after destination bus control 104 assumes control of the bus. Step 250 may further include generating a flag condition with the data in FIFO 105 exceeds a maximum threshold. The flag may cause the same memory controller to pause the read operation until the usage level of FIFO 105 is reduced by transfer of data to the destination memory 103.

Step 240 may further include maintaining, in data selector 109, a count of the amount of data, i.e., the number of sub-blocks, that have been sent to FIFO 105 for storage in the destination memory. Should this amount exceed a transfer limit, then data selector filters all sub-blocks so that no further sub-blocks are forwarded to the FIFO and may also latch the current sub-block address so that a subsequent DMA process may be started at that point. Furthermore, the data selector may signal to the source memory controller to halt the memory read. In this manner an overflow of destination memory buffer 103 is prevented.

The data selector may also, at step 240, maintain a match count and compare the match count to a predetermined transfer limit parameter which may be defined to allow only the first N matches to be sent to the destination memory. By setting the transfer memory parameter to zero, the DMA controller may be employed to provide statistical data; in this scenario, none of the data is transferred to destination memory, but the match counter may be selectively interrogated to determine, for example, the number of matched sub-blocks in the searched portion of the source memory.

Thus, while there have been shown and described and pointed out fundamental novel features of the present invention as applied to a preferred embodiment thereof, it will be understood that various omissions and substitutions and changes in the form and details of the devices illustrated, and methods described and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are merely conceptual in nature. It is the intention, therefore, to be limited only as indicated by the scope of the claims appended hereto.

We claim:

1. A direct memory access controller for facilitating transfer of data from a source memory to a destination memory via a destination bus, said direct memory access controller comprising:

a source memory controller constructed and arranged to transmit instructions to the source memory to allow data corresponding to at least a portion of each of a plurality of sub-blocks of data to be read from the source memory;

a destination bus control constructed and arranged to provide a connection to the destination bus;

a filter having at least one filter criterion and being constructed and arranged to receive the data read from the source memory, to determine by comparison whether the received data includes matched data matching the filter criterion, and to output a result of the comparison; and a data pipeline for storing the received data being compared by said filter and constructed and arranged to output data from the data stored in said data pipeline to the destination memory in accordance with the result of the comparison made by the filter.

2. The direct memory access controller of claim 1, further comprising a data selector arranged between said filter and said destination bus control, said data selector being constructed and arranged to determine the data to be transferred from said data pipeline to the destination memory.

3. The direct memory access controller of claim 2, wherein said data selector is constructed and arranged such that the data to be transferred to the destination memory include data from those sub-blocks of data that include the matched data.

4. The direct memory access controller of claim 2, wherein said data selector is constructed and arranged such that the data to be transferred to the destination memory include data from sub-blocks that are stored in said data pipeline before the sub-blocks of data that include matched data.

5. The direct memory access controller of claim 2, wherein said data selector is constructed and arranged such that the data to be transferred to the destination memory include data from sub-blocks that are stored in said data pipeline after the sub-blocks of data that include matched data.

6. The direct memory access controller of claim 2, wherein said data selector comprises a match counter to record a number of matched data.

7. The direct memory access controller of claim 6, wherein said data selector is constructed and arranged to compare the recorded number of matched data with a transfer limit and to prevent transfer of data to the destination memory when the recorded number of matched data exceeds the transfer limit.

8. The direct memory access controller of claim 2, wherein said data selector comprises a word counter for determining a word position for each word within each sub-block of data stored in said data pipeline.

9. The direct memory access controller of claim 1, further comprising a first-in-first-out memory buffer connected to said data pipeline, said first-in-first-out memory buffer being constructed and arranged to receive and buffer the data from said data pipeline that is to be transferred to the destination memory and to transfer the data to the destination memory via said destination bus.

10. The direct memory access controller of claim 1 wherein said source memory controller is constructed and arranged so that the data that is read from the source memory consists only of those data words that are required for determining whether the data matches the filter criterion.

11. The direct memory access controller of claim 1, further comprising an address pipeline for connection to the source memory and constructed and arranged to output an address of data concurrent with outputting by said filter of the comparison result for the data.

12. The direct memory access controller of claim 11, wherein said address pipeline is constructed and arranged to calculate the address of the data being compared by the filter by subtracting from a current source memory address an address offset defined by a delay of said filter.

13. A method of transferring data from a source memory to a destination memory via a destination bus using a direct memory access controller that comprises a source memory controller, a destination bus control, a filter and a data pipeline, the method comprising:

(a) transmitting instructions from the source memory controller to the source memory to cause data corresponding to at least a portion of each of a plurality sub-blocks of data to be read from the source memory;

(b) receiving the data read from the source memory at the filter and determining by comparison for the received data whether the received data includes matched data matching a filter criterion of the filter and outputting a result of the comparison; and (c) storing in the data pipeline the data being compared by the filter and outputting data from the data stored in the data pipeline to the destination memory in accordance with the result of the comparison made by the filter.

14. The method of claim 13, wherein the direct memory access controller comprises a data selector arranged between the filter and the destination bus control, said method further comprising the step of determining, by the data selector, the data to be transferred from the data pipeline to the destination memory.

15. The method of claim 14, wherein said step of outputting comprises the step of transferring to the destination memory, by the data selector, data from those sub-blocks of data in the data pipeline that include the matched data.

16. The method of claim 14, wherein said step of outputting comprises transferring to the destination memory, by the data selector, data from sub-blocks that are stored in the data pipeline before the sub-blocks of data that include matched data.

17. The method of claim 14, wherein said step of outputting comprises transferring to the destination memory, by the data selector, data from sub-blocks that are stored in the data pipeline after the sub-blocks of data that include matched data.

18. The method of claim 14, wherein said data selector comprises a match counter, said method comprising the step of recording, by the match counter, a number of matched data.

19. The method of claim 18, further comprising the step of comparing, by the data selector, the recorded number of matched data with a transfer limit and preventing transfer of data to the destination memory when the recorded number of matched data exceeds the transfer limit.

20. The method of claim 14, wherein said data selector comprises a word counter, said method comprising the step of determining, by the word counter, a word position for each word within each sub-block of data stored in the data pipeline.

21. The method of claim 13, wherein the direct memory access controller comprises a first-in-first-out memory buffer connected to the data pipeline, said method comprising the steps of receiving and buffering, by the first-in-first-out memory buffer, the data from the data pipeline that is to be transferred to the destination memory and transferring the data to the destination memory via the destination bus.

22. The method of claim 13, comprising the step of reading from the source memory, by the source memory controller, data that consists only of those data words that are required for determining whether the data matches the filter criterion.

23. The method of claim 13, wherein the direct memory access controller comprises an address pipeline connected to the source memory, said method comprising outputting, by the address pipeline, an address of data concurrent with said step of outputting the data.

24. The method of claim 23, further comprising the step of calculating, by the address pipeline, the address of the data being compared by the filter by subtracting from a current source memory address an address offset defined by a delay of the filter.

25. A direct memory access controller for facilitating transfer of data from a source memory to a destination memory via a destination bus, said direct memory access controller comprising:
  a source memory controller constructed and arranged to transmit instructions to the source memory to allow data corresponding to at least a portion of each of a plurality of sub-blocks of data to be read from the source memory;
  a destination bus control constructed and arranged to provide a connection to the destination bus;
  a filter having at least one filter criterion and being constructed and arranged to receive the data read from the source memory, to determine by comparison whether the received data includes matched data matching the filter criterion, and to output a result of the comparison; and
  an address pipeline for connection to the source memory and constructed and arranged to output an address of data in accordance with the comparison result for the data.

26. The direct memory access controller of claim 25, wherein said address pipeline is constructed and arranged to calculate the address of the data being compared by said filter by subtracting from a current source memory address an address offset defined by a delay of said filter.

27. The direct memory access controller of claim 25, further comprising a data selector arranged between said filter and said destination bus control, said data selector being constructed and arranged to determine the data for which addresses are to be transferred from said address pipeline to the destination memory.

28. The direct memory access controller of claim 27, wherein said data selector is constructed and arranged such that the data for which addresses are to be transferred to the destination memory include data from those sub-blocks of data that include the matched data.

29. The direct memory access controller of claim 27, wherein said data selector is constructed and arranged such that the data for which addresses are to be transferred to the destination memory include data from sub-blocks that are before the sub-blocks of data that include the matched data.

30. The direct memory access controller of claim 27, wherein said data selector is constructed and arranged such that the data for which addresses are to be transferred to the destination memory include data from sub-blocks that are after the sub-blocks of data that include the matched data.

31. A method of transferring data from a source memory to a destination memory via a destination bus using a direct memory access controller that comprises a source memory controller, a destination bus control, a filter and an address pipeline, the method comprising:
  (a) transmitting instructions from the source memory controller to the source memory to cause data corresponding to at least a portion of each of a plurality sub-blocks of data to be read from the source memory;
  (b) receiving the data read from the source memory at the filter and determining by comparison for the received data whether the received data includes matched data matching a filter criterion of the filter and outputting a result of the comparison; and
  (c) outputting from the address pipeline an address of data in accordance with the result of the comparison made by the filter.

32. The method of claim 31, further comprising the step of calculating, by the address pipeline, the address of the data being compared by the filter by subtracting from a current source memory address an address offset defined by a delay of the filter.

33. The method of claim 31, wherein the direct memory access controller comprises a data selector arranged between the filter and the destination bus control, said method further comprising the step of determining, by the data selector, the data for which addresses are to be transferred to the destination memory.

34. The method of claim 33, further comprising the step of transferring to the destination memory, by the data selector, addresses of data from those sub-blocks of data that include the matched data.

35. The method of claim 33, further comprising the step of transferring to the destination memory, by the data selector, addresses of data from sub-blocks that are before the sub-blocks of data that include the matched data.

36. The method of claim 33, further comprising the step of transferring to the destination memory, by the data selector, addresses of data from sub-blocks that are after the sub-blocks of data that include the matched data.

37. A direct memory access controller for obtaining statistics relating to data in a source memory, said direct memory access controller comprising:
  a source memory controller constructed and arranged to transmit instructions to the source memory to allow data corresponding to at least a portion of each of a plurality sub-blocks of data to be read from the source memory;
  a filter having at least one filter criterion and being constructed and arranged to receive the data read from the source memory, to determine by comparison whether the received data includes matched data matching the filter criterion, and to output a result of the comparison; and
  a data selector comprising a match counter constructed and arranged to record a number of matched data in accordance with the result of the comparison made by the filter.

38. The direct memory access controller of claim 37, wherein said data selector is constructed and arranged to compare the recorded number of matched data with a transfer limit and to prevent transfer of data to a destination memory when the recorded number of matched data exceeds the transfer limit.

39. A method of obtaining statistics relating to data in a source memory using a direct memory access controller that comprises a source memory controller, a filter and a data selector having a match counter, the method comprising:
  (a) transmitting instructions from the source memory controller to the source memory to cause data corresponding to at least a portion of each of a plurality of sub-blocks of data to be read from the source memory;
  (b) receiving the data read from the source memory at the filter and determining by comparison for the received data whether the received data includes matched data matching a filter criterion of the filter and outputting a result of the comparison; and, (c) the match counter recording a number of matched data in accordance with the result of the comparison made by the filter.

40. The method of claim 39, further comprising the step of comparing, by the data selector, the recorded number of matched data with a transfer limit and preventing transfer of data to a destination memory when the recorded number of matched data exceeds the transfer limit.

41. A network analyzer comprising a direct memory access controller according to claim 1.

42. A network analyzer comprising a direct memory access controller according to claim 25.

43. A network analyzer comprising a direct memory access controller according to claim 37.

* * * * *